C. H. WILLIAMS, Jr.
BRAKE HANGER MOUNTING.
APPLICATION FILED NOV. 11, 1910.
989,887.
Patented Apr. 18, 1911.
2 SHEETS—SHEET 1.
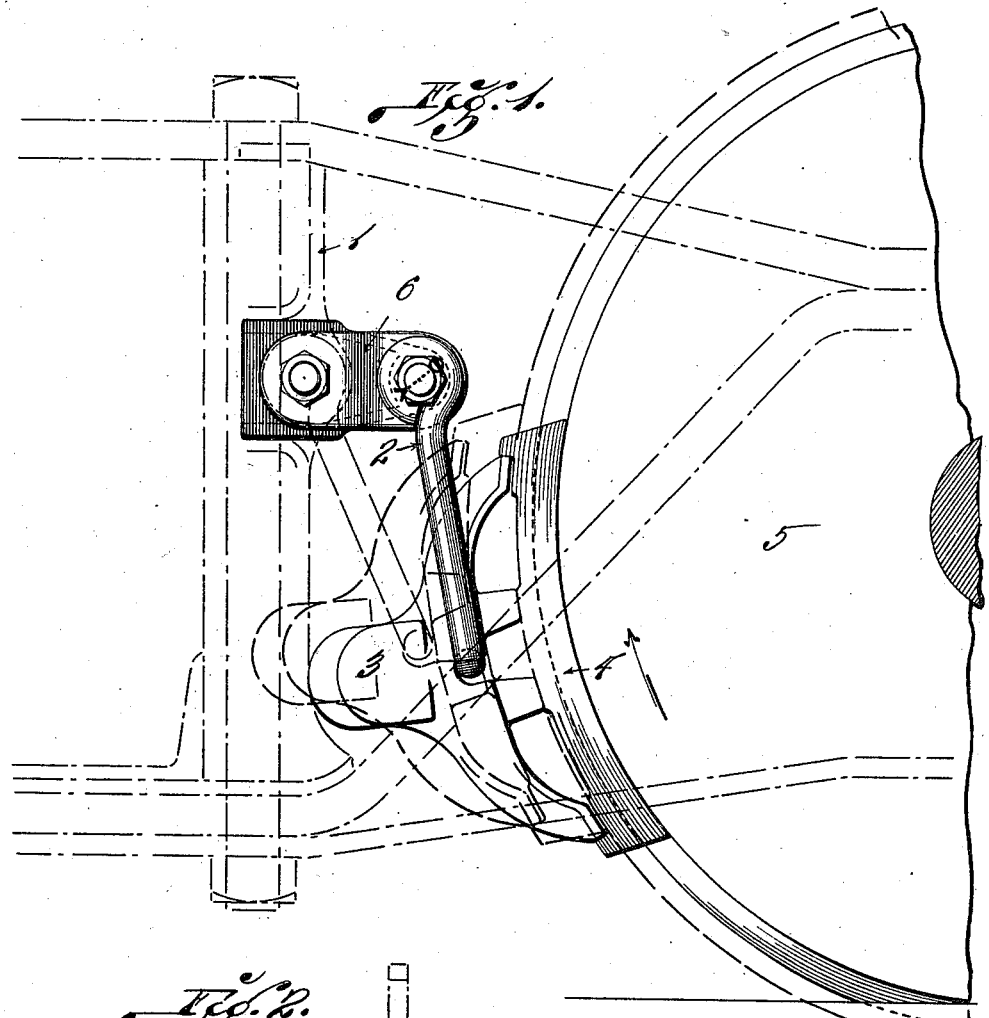
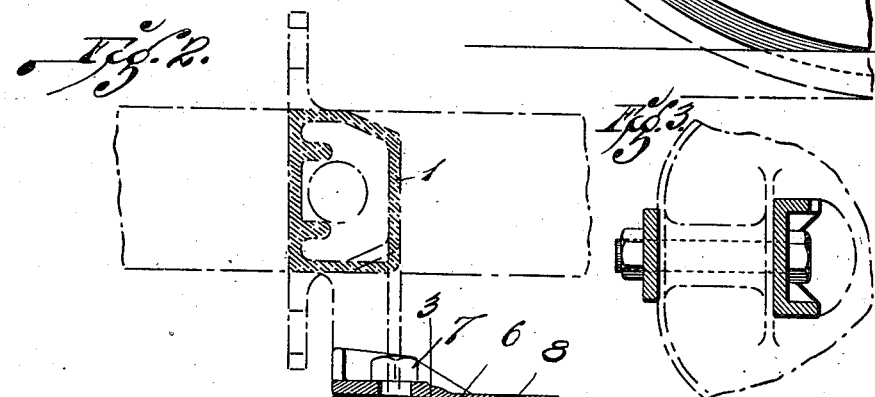

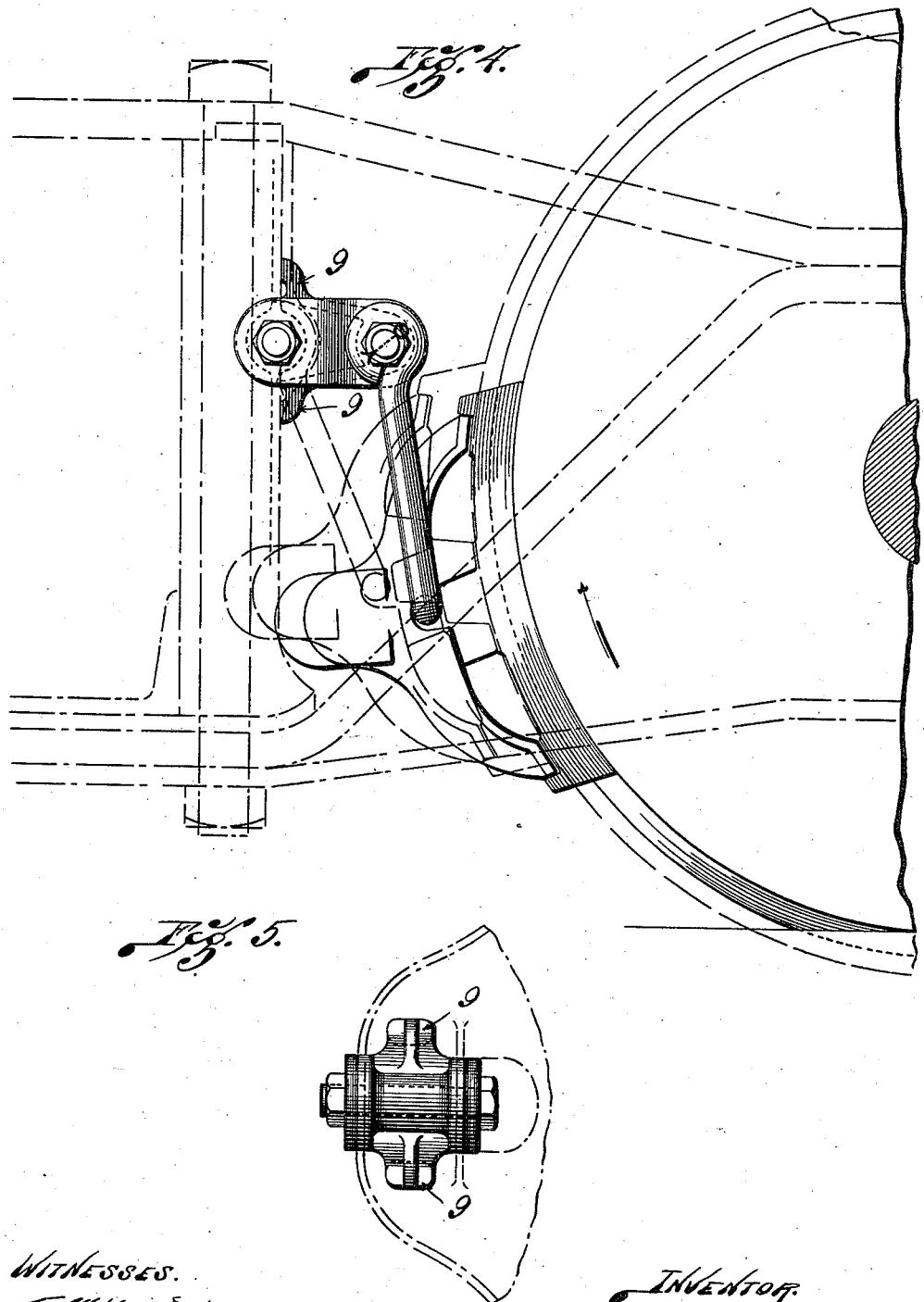

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-HANGER MOUNTING.

989,887.	Specification of Letters Patent.	Patented Apr. 18, 1911.

Application filed November 11, 1910. Serial No. 591,917.

*To all whom it may concern:*

Be it known that I, CHARLES H. WILLIAMS, Jr., a citizen of the United States, residing at Chicago, Illinois, have invented a certain new and useful Improvement in Brake-Hanger Mountings, of which the following is a full, clear, and exact description, such as will enable others skilled in the art to which it appertains to make and use the same, reference being had to the accompanying drawings, forming part of this specification, in which—

Figure 1 is a side elevational view of my improved hanger mounting; Fig. 2 is a horizontal sectional view through the same; Fig. 3 is a sectional view on line 3—3, Fig. 2. Fig. 4 is a side elevational view of a modified form; and Fig. 5 is an end view of the modified form shown in Fig. 4.

This invention relates to a new and useful improvement in a brake hanger mounting designed particularly for use in car trucks, the object being to construct a mounting of the character described, in the nature of a bracket to be attached in position so as to provide a new pivotal support to the brake hanger when the wearing of the shoe or the reduction in the diameter of the wheel with which the brake shoe coöperates renders a change in the pivotal support of the hanger necessary or desirable.

In recent years, steel car wheels have gone into extensive use, with the result that repeated grinding of these wheels for the purpose of truing them when worn and extending their life has necessitated some changes in the brake rigging to meet these new conditions. For instance, a wheel 33 inches in diameter may be reduced eventually to 30 inches in diameter, and such reduction will change the relation of the brake beam to the wheels, particularly if the old pivotal supports for the brake beams remain unchanged. The tendency is, when the wheel is reduced and the brake shoe worn, to bind or cramp the brake in a set position, as, for instance, when a wheel is moved in the direction of the arrow. This results in an abnormal upward movement of the brake shoe on the wheel, which causes the brake head to coöperate with the brake hanger, as a toggle link, which renders it hard and difficult to release the brake.

According to my improvement, when the wheel is of the usual diameter and the brake shoe new, the brake hanger is arranged in its support on the column guide or other part of the truck in the usual manner. When the brake shoe is worn or the wheel is reduced so that the brake shoe rides up the wheel an abnormal extent, which movement would tend to produce the cramping action mentioned, I provide a bracket which may be secured in position on the column guide or other part of the truck, the securing bolt being preferably employed in the opening formerly occupied by the brake hanger, and which bracket is provided with one or more openings in which the hanger may be mounted so as to change its relation to the brake beam and in this manner reestablish its proper working relation to said beams.

In the drawings, 1 indicates the column guide of the truck which may be provided with the usual opening for the suspension of the brake hanger 2, and 3 is the head of a well-known type of brake beam, and 4 is a shoe carried by said head.

5 is the wheel with which the shoe coöperates, and 6 is a bracket preferably bifurcated so as to straddle the brake hanger lug, said bracket being secured in position on said lug by means of a bolt and nut 7. This bracket is provided with a part extending toward the wheel 5, which is shaped like the brake hanger lug, it being provided with an opening 8 for the suspension of the hanger 2. In this manner the point of suspension of the hanger may be changed so that the relation of the brake shoe to the wheel will conform to practical and proper working conditions.

While I have shown the bracket 6 as being provided with but a single suspension opening for the brake hanger, it is obvious that two or more of such openings may be employed if desired, whereby a wider range of adjustment of the pivotal support of the hanger can be secured.

In Fig. 3 it will be seen that the extension from the column guide is provided with an opening in which one ear of the bracket extension is received, whereby the bracket extension is prevented from tilting or canting in its position. I also prefer, as shown in Fig. 2, to cut away the reinforcing web between the lugs or ears of the bracket, whereby said lugs or ears may be sprung inwardly by the clamping bolt in its attachment to the column guide.

In Figs. 4 and 5, instead of extending the lug of the bracket extension into the opening of the column guide, I provide bearing lugs 9 to engage the side face of the column guide to prevent the bracket extension from tilting or canting in its position.

What I claim is:

1. The combination of a car truck having means for suspending a brake hanger therefrom and a part designed to be secured to said car truck and providing additional means for the suspension of said brake hanger.

2. The combination of a car truck having means for the suspension of a brake hanger and a bracket designed to be secured in position at the point where said brake hanger was suspended, said bracket providing a new point of support for said brake hanger.

3. A brake hanger mounting, having lugs or extensions for attachment to a car truck, said lugs or extensions being made yielding to tightly clamp the truck, said mounting also having means for the suspension of a brake hanger.

4. The combination of a car truck having means for the suspension of a brake hanger therefrom, and a bracket provided with perforated lugs or ears adapted to be secured to said truck at the point of suspension of said brake hanger, said bracket being also provided with means for preventing tilting when in position on the truck and having a perforated extension for the suspension of the brake hanger.

In testimony whereof I hereunto affix my signature in the presence of two witnesses, this 27th day of September, 1910.

CHARLES H. WILLIAMS, Jr.

Witnesses:
 E. T. WALKER,
 M. F. HUNTOON.

---

Copies of this patent may be obtained for five cents each, by addressing the "Commissioner of Patents, Washington, D. C."